April 21, 1964    R. H. CANNING ETAL    3,129,584
FORCE MEASURING DEVICE
Filed March 10, 1961
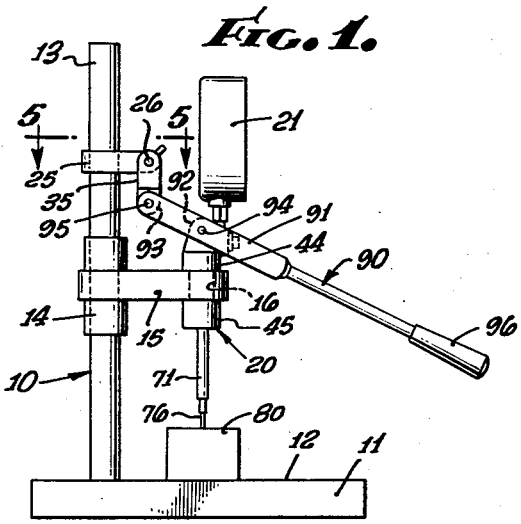
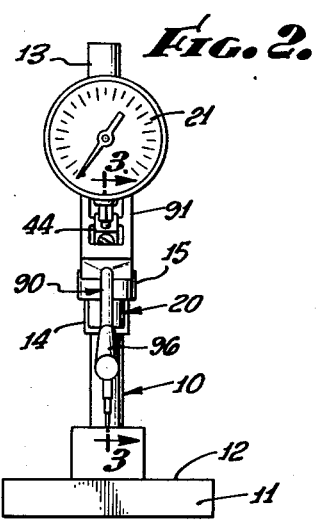
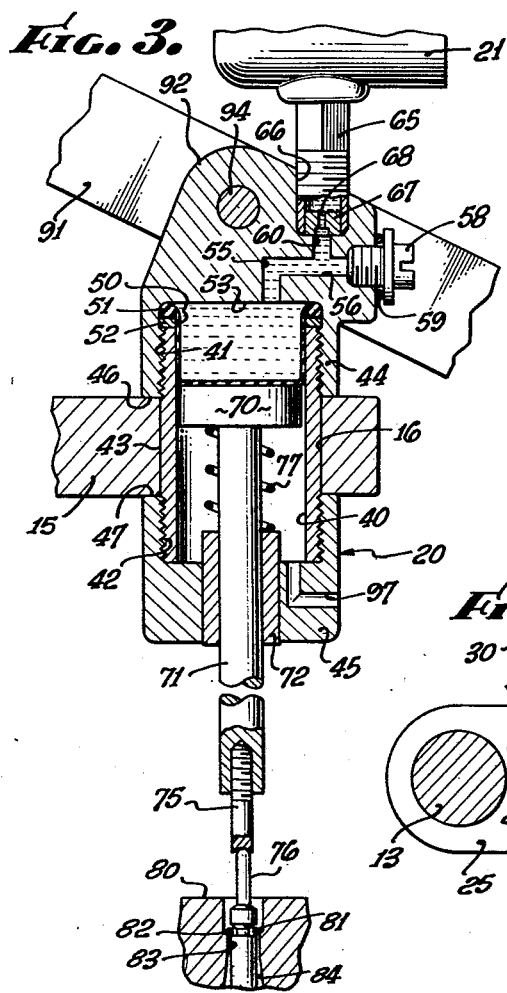
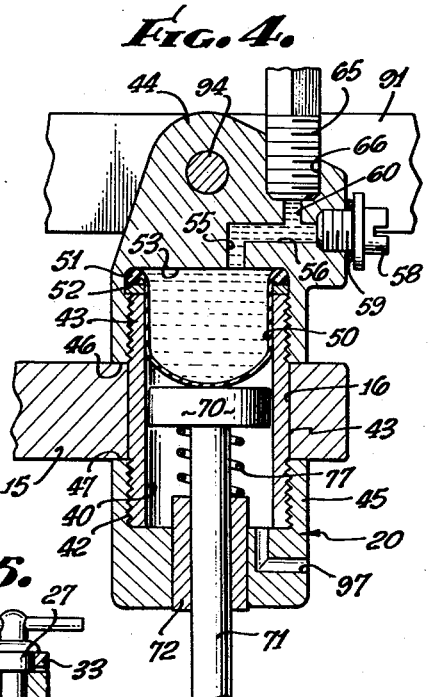
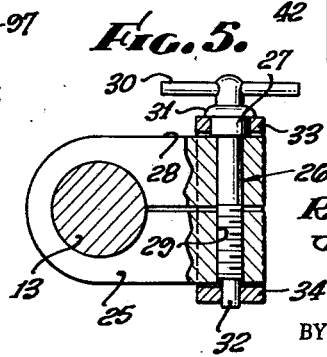
RICHARD H. CANNING
JAMES E. CORDNER
INVENTORS
BY Huebner & Worrel
ATTORNEYS.

United States Patent Office 3,129,584
Patented Apr. 21, 1964

3,129,584
FORCE MEASURING DEVICE
Richard H. Canning and James E. Cordner, Los Angeles,
Calif., assignors to Cannon Electric Company, Los Angeles, Calif., a corporation of California
Filed Mar. 10, 1961, Ser. No. 94,741
5 Claims. (Cl. 73—141)

This invention relates to a force measuring device, and more particularly to a hydraulically actuated device, for registering the physical force required to move an element against frictional resistance with respect to a mating element. Examples of use are in determining mating force between any two parts of a hydraulic fitting, force required to insert electrical connector pins or sockets into shells or insulators, and the force required to remove the pins or sockets from the shells or insulators (the pins or sockets sometimes being provided with annular shoulders which are forced through restricted bores into annular grooves), or the force required to insert electrical connector pins or sockets carrying compressible C-rings through restrictions in an insulation block for expansion behind a shoulder of the block, as well as the force required to remove the pins or sockets from that insulation. These are examples only, and the force measuring device may of course be used for various other purposes.

An object of the invention is to provide a force measuring device of the general character identified wherein a substantially noncompressible fluid body is employed in transmitting the force from its point of application to a measuring gage, such for example, as a conventional Bourdon gage, whereby a more accurate reading may be obtained than is ordinarily available through spring actuated measuring devices.

Another object of the invention is to provide a force measuring device of the character described wherein the force transmission is calibrated in pounds per square inch on the dial of the force gage.

Another object of the invention is to provide a portable force measuring device of the aforementioned character, which is relatively compact and light in weight.

An additional object in supplement of the foregoing objects, is to provide in a combination of elements comprising a force measuring device a body of substantially noncompressible fluid as the medium of force transmission between the point of application and the gage per se, the body of fluid being enclosed by fluid impervious sealing means, preventing any leakage and consequent inaccuracy of registration.

A further additional object of the invention is to provide a combination of elements, as defined above, wherein friction of moving parts is reduced to a minimum, and is at the same time a constant factor, whereby variables in force measurement are virtually eliminated.

These and other objects and advantages of the invention will be made further apparent from a consideration of the detail description which follows, taken in conjunction with the accompanying drawing, in which:

FIGURE 1 is a side elevational view of the force measuring device engaging a member upon which the physical force required to accomplish a given movement of the member is to be measured.

FIGURE 2 is a front elevational view of the device shown in FIGURE 1.

FIGURE 3 is an enlarged vertical sectional view taken on the line 3—3 of FIGURE 2.

FIGURE 4 is an enlarged sectional view of the central portion of the device illustrated in FIGURE 3, but with the parts shown under conditions where no force is being applied and the parts are in repose.

FIGURE 5 is a horizontal cross-sectional view taken on the line 5—5 of FIGURE 1, illustrating in top plan an adjustable collar mounted on a vertical post of the assembly.

Referring now to the drawing in more detail, the device comprises in general a support structure 10, a force transmission assembly 20 and a hydraulically actuated force gage 21.

The support structure comprises a base 11 having a flat top platform surface 12 and rigidly supporting a vertical post 13. Mounted for free sliding movement on the post 13 is a collar 14 formed with an annular bore which functions as a bushing on the post 13, and extending horizontally from the collar 14 is a bracket arm 15. The outer end of the arm is formed with a vertical bore 16 for mounting the force transmission assembly 20.

A split mounting collar 25 is adjustably secured upon the post 13 by means of a thumb screw 26 having a special configuration which will be described. The thumb screw includes an annular head 27 which bears upon the outside surface 28 of one leg of the split collar, and the screw threadedly engages in a threaded bore 29 in the other leg of the split collar. Tightening of the screw by means of a handle 30 brings the two legs together and increases the clamping action on the post 13. The screw 26 is formed with a thrust shoulder 31 adjacent the annular head 27 and also with a reduced pivot extension 32 at the end opposite the shoulder, the annular head 27 and the pivot extension 32 providing a cooperative pivotal mounting for the opposed forks 33 and 34 of a wishbone yoke 35. The collar 25 may be securely clamped at a desired height upon the post 13 by loosening bolt 26, holding the collar at the desired position, and retightening the bolt.

The force transmission assembly 20, previously identified, comprises a cylinder 40 initially open at both ends and externally threaded at both ends as at 41 and 42. The central unthreaded exterior portion 43 of the cylinder is adapted to seat in the bore 16 of the bracket arm 15, and is securely retained in position therein by the combined effect of a block 44 and a cap 45 threaded upon the upper threads 41 and lower threads 42, respectively, of the cylinder, an annular shoulder 46 bearing upon the upper surface of the bracket arm 15, and an annular shoulder 47 bearing against the lower surface of the bracket arm 15.

Mounted in the upper end portion of the cylinder 40 is a fluid impervious sack or diaphragm 50 having a diameter of the general magnitude of the cylinder, and being formed with an annular bead 51 which rests upon an annular friction ring 52 disposed at the top of the cylinder. The diaphragm is retained in position by pressure of a face 53 of the block 44 when the latter is screwed into position on the cylinder, and the bead 51, which functions in the nature of an O-ring, provides a fluid seal for the diaphragm in the cylinder.

The open upper end of the diaphragm or sack 50 is in communication with a fluid passage 55 formed in the block 44. This passage 55 has two branches, one of which, 56, extends to the outside of the block for introducing fluid, and the opening to the outside is plugged by a threaded filler cap 58 and a conventional O-ring 59. The other branch 60 of the fluid passage 55 leads to the outside in a generally vertical direction and is in communication with the hydraulically actuated gage 21, previously identified. The engagement is afforded by a hollow threaded stem 65 which is screwed into a tapped countersink 66 in the block. Preferably, although it is not absolutely necessary, we provide an insert 67 in the lower end of the stem 65, the insert 67 containing a reduced fluid passage 68 to provide a dampening action between the gage and the fluid passage 55. It has been found that while the device will operate without the reduced passage or orifice 68, such is desirable to prevent shock to the system of the device when the resistance of the element being tested is overcome and the element suddenly gives way.

A piston 70 is reciprocably mounted in the cylinder below the diaphragm by means of a piston rod 71 slidably mounted in a bushing sleeve 72 which is affixed in the cap 45. It is preferable that the bushing sleeve 72 be made of bronze or any of the self-lubricating type materials, one example of which is known in the trade as "Oilite." This is a matter of choice and not of necessity.

The piston should have a freely slidable fit within the cylinder. It contains no sealing rings. Its physical function primarily is to press upon the bottom of the diaphragm or sack 50 in order to communicate force axially impressed upon the piston rod 71.

The lower end of the piston rod preferably carries a tool, such as, for example, a hollow-ended punch 75, which is shown as threaded into the lower end of the piston rod. The punch is for making axial contact with an element concerning which the force is to be tested, such element being illustrated in the drawing as an electrical contact pin 76.

A light coil spring 77 is employed between the lower face of the piston 70 and the upper end of the bushing sleeve 72. This spring is of such size and tension as to hold the weight of the piston and piston rod assembly in proximity to the lower end of the diaphragm 50 when the device is not in the process of testing a force. It will be seen that the spring in effect automatically takes up slack in the relationship between the piston and the diaphragm when the parts are in repose, so that the device is in readiness at all times to perform its force testing operation without undue initial axial movement of the piston and piston rod.

In the example of the element to be tested, the connector pin 76 is shown mounted in an insulator block 80, being held therein by a spring C-ring 81 engaging an annular tapered shoulder 82, providing an obstruction in an elongated bore 83. In this structure the pin has been inserted from the rear of the insulator block by a force sufficient to compress the C-ring in its passage through the long taper 84 of the bore 83, and the ring has snapped into its expanded position upon passing the shoulder 82. It may be necessary to ascertain, among other things, what force is needed to drive the pin 76 in a reverse direction to remove it from the insulation block. Our testing device is shown as being used for determining the force required to perform the described dislodgement for removal. It is emphasized that this application of use is by way of example only, and not of limitation.

The block 44, and the parts which are affixed to it directly or indirectly, are suspended for vertical reciprocation by means of a lever 90. This lever 90 includes a bifurcated forward end section 91, the legs of which straddle an ear 92 formed on the upper end of the block 44, and also straddle the stem 93 forming part of the wishbone yoke 35. A pivot pin 94 provides a pivotal relationship between the lever 90 and the ear 92, and a pivot pin 95 provides a pivotal relationship between the lever 90 and the stem 93. A handle portion 96 is provided at the outer free end of the lever 90. Up and down movement manually applied to the handle 96 will result in vertical movement of the block 44 and its dependent parts, including the cylinder and the piston, in a predetermined axial movement, by reason of the fact that there is a parallel relationship between the post 13 and the cylinder, piston and piston rod, which is maintained by the sliding action of the collar 14 on the post, and the wishbone yoke 35 functions as a pendulum link to anchor the inner end of the lever 90, at the same time allowing the necessary deviation of the axis of the pivot pin 95 when the lever is raised or lowered.

The gage 21 may be any suitable type of gage which registers pressure of a fluid through the medium of a vane and ratchet, or any other suitable mechanism. These Bourdon type gages, and other gages, which will perform the required function, are well-known and need not be described. It is preferred to employ one which is calibrated in pounds per square inch. Furthermore, it is desirable to provide a cylinder, which although circular in cross-section, contains an internal cross-sectional area equal to one square inch. This simplifies and renders accurate the transmission and registration of force supplied by the piston without intermediate mechanical translating means.

The operation of the device should be apparent from the foregoing description, but will be recapitulated. The diaphragm and communicating fluid passages, including the gage, should be completely filled with hydraulic fluid, preferably of a type which is substantially noncompressible; water falls in this category, and may be employed, although other hydraulic fluids can be used. Filling is done by removal of the filler cap 58, after which the cap is replaced and tightened. Care should be exercised to remove air as the hydraulic fluid is introduced, in order that air bubbles be avoided in the gage, the diaphragm and the fluid passages. Prior to use, the diaphragm and piston will adopt the general position illustrated in FIGURE 4. At this time the lever 90 will normally rest on a shoulder provided on the block 44 where an offset occurs to form the ear 92.

When it is desired to measure the force required to unseat the pin 76, the lever 90 is elevated in order to place the insulation block 80 on the platform 12 with the pin in axial alignment with the punch 75. The lever 90 is then depressed so that the punch exerts an axial pressure upon the pin 76. This causes a relative movement between the piston and the cylinder wall, the face of the piston making pressural engagement with the bottom of the diaphragm or sack 50 as pressure is gradually applied manually through the medium of the lever 90. This pressure is communicated through the medium of the hydraulic fluid in the system into the gage 21, and observation of the dial on the calibrated scale of the gage continues to the point in the operation where the C-ring has been contracted sufficiently so that it snaps through the restricted portion of the bore 84, whereupon the major obstacle to removal of the pin has been accomplished, and the maximum pressure in pounds per square inch has been visually noted on the gage. An air vent 97 formed in the cap 45 communicates between the chamber within the cylinder below the piston, and the atmosphere, to avoid undesirable build-up of pressure or vacuum which might otherwise render inaccurate the pressure reading.

While we have herein shown and described our invention in what we have conceived to be the most practical and preferred embodiments, it is recognized that departures may be made therefrom within the scope of our invention, which is not to be limited to the details disclosed herein but is to be accorded the full scope of the claims so as to embrace any and all equivalent devices.

What we claim as new and desire to secure by Letters Patent is:

1. The combination of: a cylinder, a piston reciprocable in the cylinder and being of a diameter sufficiently less than the diameter of the interior of said cylinder to minimize frictional engagement between the piston and cylinder walls, rigid means extending from one end of the piston to pressurably engage an element for exerting a force axially of the piston in one direction and in line with said piston, a fluid actuated force gage, means providing a fluid chamber between the opposite end of the piston and the force gage, and means providing fluid communication between said chamber and said force gage, the means providing the fluid chamber including a flexible fluid impervious diaphragm reposing in the cylinder closing said chamber and an external portion of said diaphragm being engageable by said piston, and a body of substantially noncompressible fluid in said chamber, whereby application of force upon said rigid means is transmitted by said piston through said fluid body to actuate said force gage.

2. A force measuring device comprising, a support, a cylinder slidably mounted on said support, a piston reciprocable in the cylinder, said piston being sufficiently smaller in cross-section than the diameter of the interior of said cylinder to minimize frictional engagement between the piston and the wall of the cylinder, rigid means extending from one end of the piston to pressurably engage an element for exerting a force axially of the piston in one direction and in line with said piston, a fluid actuated force gage, means providing a fluid container communicating between the opposite end of the piston and the force gage, the means providing the fluid container communicating between the opposite end of the piston and the force gage, the means providing the fluid container including a flexible fluid impervious diaphragm reposing in the cylinder and an external portion of the diaphragm being engageable by said piston, a body of substantially noncompressible fluid filling said container, whereby application of force upon said rigid means is transmitted by said piston through said fluid body to actuate said force gage, and means for axially moving said cylinder whereby said rigid means may be moved into pressurable engagement with said element.

3. The combination of: a support post, bracket means freely slidable on said post, cylinder means rigidly affixed upon said bracket means, said cylinder means including a cylinder head means at one end and a cap at the other end embodying a guide for a piston rod, a piston reciprocable in said cylinder means and provided with a piston rod extending outwardly through said guide, means at the outer end of said piston rod for engaging an element as part of a pressure ascertaining operation, the cylinder head means having a fluid passage therein, a fluid actuated force gage mounted on said cylinder head means, a diaphragm mounted in said cylinder means adjacent the cylinder head and providing a fluid tight chamber in said cylinder, said diaphragm being adapted for external pressure engagement by said piston, said fluid passage communicating between said force gage and said chamber, substantially noncompressible fluid filling said chamber, and said fluid passages, linkage means mounted upon said post and pivotally connected with said cylinder head means, said linkage means embodying a manually operable lever whereby the cylinder means and the piston may be moved parallel to the axis of the post for advancing the piston rod to effect pressure engagement with said element whereby the pressure imposed upon said piston rod is transmitted through said piston and fluid body to register upon the gage.

4. The combination of: a support post, bracket means freely slidable on said post, cylinder means rigidly affixed upon said bracket means, said cylinder means including a cylinder head means at one end and a cap at the other end embodying a guide for a piston rod, a piston reciprocable in said cylinder and provided with a piston rod extending outwardly through said guide, means at the outer end of said piston rod for engaging an element as part of a pressure ascertaining operation, cylinder head means having a fluid passage therein, a fluid actuated force gage mounted on said cylinder head means, a flexible sack-like diaphragm mounted in said cylinder means adjacent the cylinder head and providing a fluid tight chamber in said cylinder, said diaphragm being adapted for external pressure engagement by said piston, said fluid passage communicating between said force gage and said chamber, a compression spring interposed between the piston and the cap urging the piston into proximity to the external end surface of the diaphragm, substantially noncompressible fluid filling said chamber, and said fluid passages, linkage means mounted upon said post and pivotally connected with said cylinder head means, said linkage means embodying a manually operable lever whereby the cylinder means and the piston may be moved parallel to the axis of the post for advancing the piston rod to effect pressure engagement with said element whereby the presure imposed upon said piston rod is transmitted through said piston and fluid body to register upon the gage.

5. The combination of: a cylinder, a piston reciprocable in the cylinder and being of a diameter sufficiently less than the diameter of the interior of said cylinder to minimize frictional engagement between the piston and cylinder walls, rigid means extending from one end of the piston to pressurably engage an element for exerting a force axially of the piston in one direction and in line with said piston, a fluid actuated force gage, means providing a fluid chamber between the opposite end of the piston and the force gage, and means providing fluid communication between said chamber and said force gage, the means providing the fluid chamber including a flexible fluid impervious diaphragm reposing in the cylinder closing said chamber and an external portion of said diaphragm being engageable by said piston, and a body of substantially noncompressible fluid in said chamber, whereby application of force upon said rigid means is transmitted by said piston through said fluid body to actuate said force gage, and a spring means engaging the piston maintaining said piston engageable with said diaphragm.

References Cited in the file of this patent
UNITED STATES PATENTS

| | | |
|---|---|---|
| 427,604 | McKay | May 13, 1890 |
| 657,950 | Miller | Sept. 18, 1900 |
| 2,440,718 | Hornbostel | May 4, 1948 |
| 2,843,077 | Leefer | July 15, 1958 |